United States Patent [19]

Petiteau

[11] Patent Number: 4,566,346
[45] Date of Patent: Jan. 28, 1986

[54] AUTOMATED TOOL MANIPULATING STRUCTURE WITH X-Y MOVEMENT INCLUDING A BELT AND PULLEY DRIVE ARRANGEMENT

[76] Inventor: Maurice R. Petiteau, 7, rue Sancey, F-25000 Besancon, France

[21] Appl. No.: 441,532
[22] PCT Filed: Mar. 9, 1982
[86] PCT No.: PCT/FR82/00041
 § 371 Date: Nov. 8, 1982
 § 102(e) Date: Nov. 8, 1982
[87] PCT Pub. No.: WO82/03044
 PCT Pub. Date: Sep. 16, 1982

[30] Foreign Application Priority Data
 Mar. 10, 1981 [FR] France .................. 81 04747

[51] Int. Cl.[4] .................. B25J 11/00; F16H 19/06
[52] U.S. Cl. .................. 74/89.22; 414/749; 901/16; 74/479
[58] Field of Search .......... 74/471 XY, 89.2, 89.21, 74/89.22, 479; 414/749; 901/16

[56] References Cited
U.S. PATENT DOCUMENTS

| | | | |
|---|---|---|---|
| 2,792,953 | 5/1957 | King | 214/146.5 |
| 2,822,094 | 2/1958 | Greer | 212/127 |
| 2,991,663 | 7/1961 | McHugh | 74/471 X |
| 3,502,882 | 3/1970 | Von Voros | 901/16 X |
| 3,906,325 | 9/1975 | Salmon | 901/16 X |
| 4,144,975 | 3/1979 | Tsuboi et al. | 414/749 X |
| 4,260,319 | 4/1981 | Motada et al. | 901/16 X |
| 4,311,052 | 1/1982 | Jeffras et al. | 901/16 X |
| 4,327,596 | 5/1982 | Simon | 414/749 X |
| 4,401,406 | 8/1983 | Rovira | 414/749 X |
| 4,409,860 | 10/1983 | Moriyama et al. | 74/479 |

FOREIGN PATENT DOCUMENTS

| | | |
|---|---|---|
| 2930006 | 2/1981 | Fed. Rep. of Germany . |
| 0074850 | 1/1961 | France . |
| 2020183 | 7/1970 | France . |
| 0036869 | 4/1978 | Japan .................. 901/16 |
| 0262600 | 11/1970 | U.S.S.R. .................. 414/749 |

OTHER PUBLICATIONS

Proceedings of the 10th Conference on Hot Laboratories and Equipment, Nov. 26–28, 1962, American Nuclear Society (Chicago, US), C. L. Hunt et al., "The Beetle, A Mobile Shielded Cab With Manipulators", p. 169 and FIGS. 1 and 3.
Proceedings of the 4th International Symposium on Industrial Robots, Nov. 19 to 21, 1974, Japan Industrial Robot Assoc. (Tokyo, JP), L. Caprioglio, "The Deltix Spot Welding Robot in the Automotive Industry", p. 510, and FIGS. 3 and 6.

Primary Examiner—Lawrence J. Staab
Attorney, Agent, or Firm—Fisher, Christen & Sabol

[57] ABSTRACT

Automatic manipulator having a frame with respect to which two moving members can slide, under the action of actuators, and in both ways of two different directions. At least one of the moving members has the structure of a frame sliding in its plane with respect to the frame. The other moving member is mounted inside of the frame so as to slide with respect to the latter parallel to its plane. A rigid, accurate manipulator, capable of carrying a plurality of tools, is obtained.

6 Claims, 6 Drawing Figures

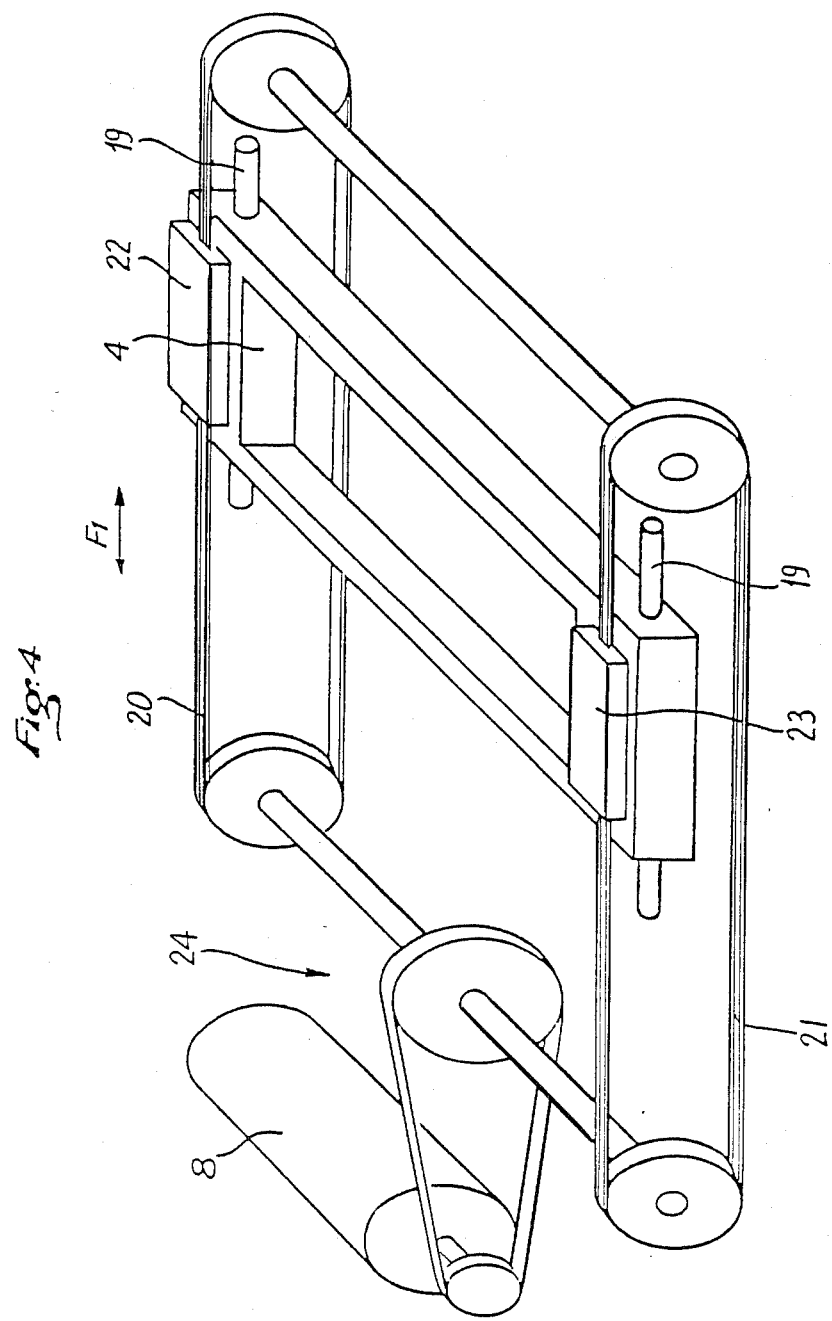

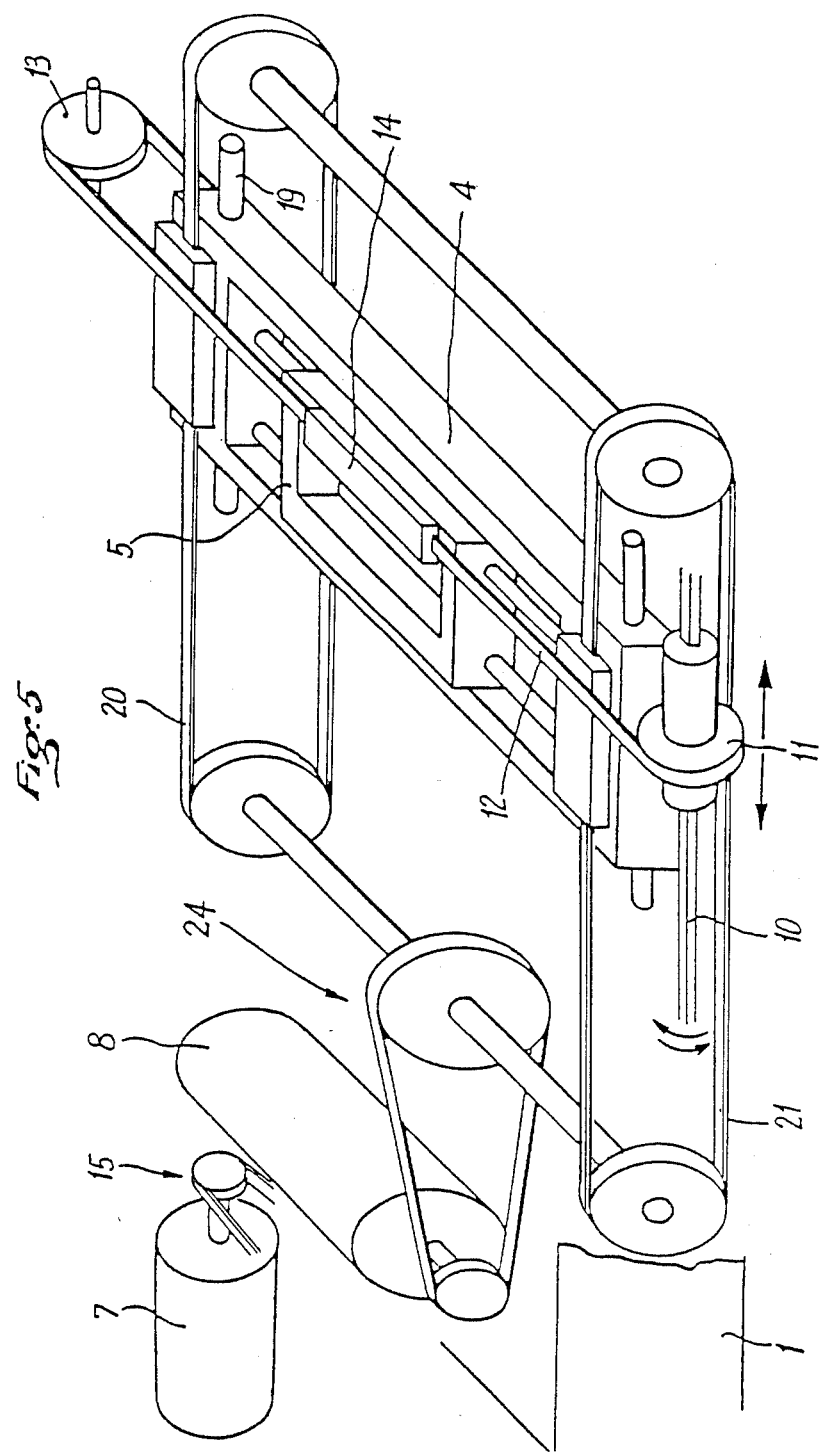

AUTOMATED TOOL MANIPULATING STRUCTURE WITH X-Y MOVEMENT INCLUDING A BELT AND PULLEY DRIVE ARRANGEMENT

The present invention relates to a programmable fine manipulator particularly adapted to the assembling method in the field of products of small or average volumes.

Manipulators are already known which comprise a frame structure with respect to which two movable members can slide in both ways of two orthogonal directions under the action of actuating members. These known manipulators are often designated under the name of table XY and the movable members are constituted of two superimposed plates, whereas the actuators (motor or jack) are respectively mounted on said movable members. As a result of which these known manipulators show great inertia and have to comprise an overhanging arm, fast with one of the said movable members in order to grasp the parts to be assembled.

Such manipulators operate with average accuracy, of between 0.2 and 0.5 mm. They are not very well adapted to the assembling method because:

1. For each element to be assembled, they have to travel to and fro between the gripping point and the setting down point.
2. For any new element to be taken up, it is mostly necessary to change the grasping tool.

In addition, these structures with overhanging movable arms are rigid, which is incompatible with the precision requirements.

It is the object of the present invention to overcome these drawbacks. The manipulator of this invention achieves this object. The manipulator of the type comprising a frame structure with respect to which two movable members can slide in both ways of two different directions under the action of actuating members, is noteworthy in that at least one of the said movable members has the structure of a frame which can slide in its plane with respect to the said frame structure and in that the other movable member is mounted inside the said frame structure so as to slide with respect to the latter in parallel to its plane.

Preferably, in order to reduce as much as possible the inertia of the manipulator, the actuating members are fixedly mounted on the frame structure and the movement is transmitted to the movable members via transmissions, such that the transmission associated with the movable member inside said frame structure comprises a sliding element.

Preferably, the movable element internal to the frame structure is also shaped as a frame, so that movable members can pass therethrough.

The transmission associated with the inner movable member can be provided with a shaft driven in rotation, a pulley being slidable with respect thereto, which pulley is fast in rotation with said shaft, the movement of said inner movable member being imparted by the pulley. It is particularly advantageous if the transmissions are of the belt and pulley type.

The frame structure can optionally be made to move for example in a direction which is orthogonal to the moving directions of the said movable members. And a manipulator XYZ is thus obtained.

It is therefore obvious that the device according to the present invention makes it possible.

to pick up tools for gripping, handling, welding and other tools, to travel only one return course instead of several, with no necessity for additional time to use another already picked-up tool, a maximum lightening of the movable parts, since the actuating members are fixedly mounted, great rigidity due to the fitted-in frame structure which can constitute an offset-gantry type structure.

Such a structure is for example obtained by mounting the assembly consisting of the frame structure and of the two movable frames on columns, which makes the manipulator according to the invention much more rigid, this rigidity being compatible with the precision targets demanded by the applications considered in the field of micromechanics.

The figures in the accompanying drawing will illustrate how the invention can be carried out.

FIG. 3b is a cross-sectional view of an alternative embodiment of the bar of FIG. 3a.

FIG. 4 is a perspective view of the outer frame and of its driving device.

FIG. 5 is a perspective view showing the position of the inner and outer frames and of their driving devices.

Where applicable in these figures, identical references are used to designate similar elements.

Figure 1:
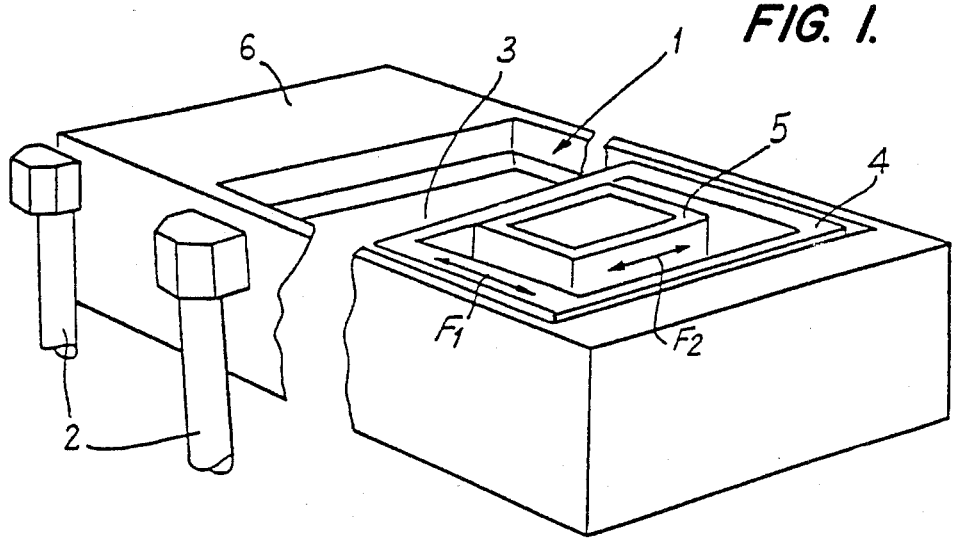
FIG. 1 is a partial diagrammatical perspective view of the manipulator according to the invention.

The manipulator according to the invention, illustrated in these figures, comprises a rigid frame structure 1, of parallelepipedal shape for example. Said frame structure 1 is mounted on columns 2, of variable length for example, which length can be controlled, so that the assembly consisting of the frame structure 1 and of the columns 2 forms an offset-gantry type structure. To this effect, the columns 2 are situated at the same end of the frame structure 1.

An offset-gantry type structure indicates the portico (porch) structure of platform 6 and columns 2, the columns being all arranged at one end of said platform in such a way that the platform 6 is supported by overhanging on the columns 2.

Inside the frame structure 1, there is provided a hollow 3 in which a first outer frame 4 can move by sliding.

Inside said frame 4 can move an inner frame 5. The displacements of the frame 4 (arrows F1) and of the frame 5 (arrows F2) are orthogonal.

Moreover, the frame structure 1 comprises a compartment 6 inside which are housed the members actuating the frames 4 and 5, such as for example electric motors 7 and 8.

Figure 2:
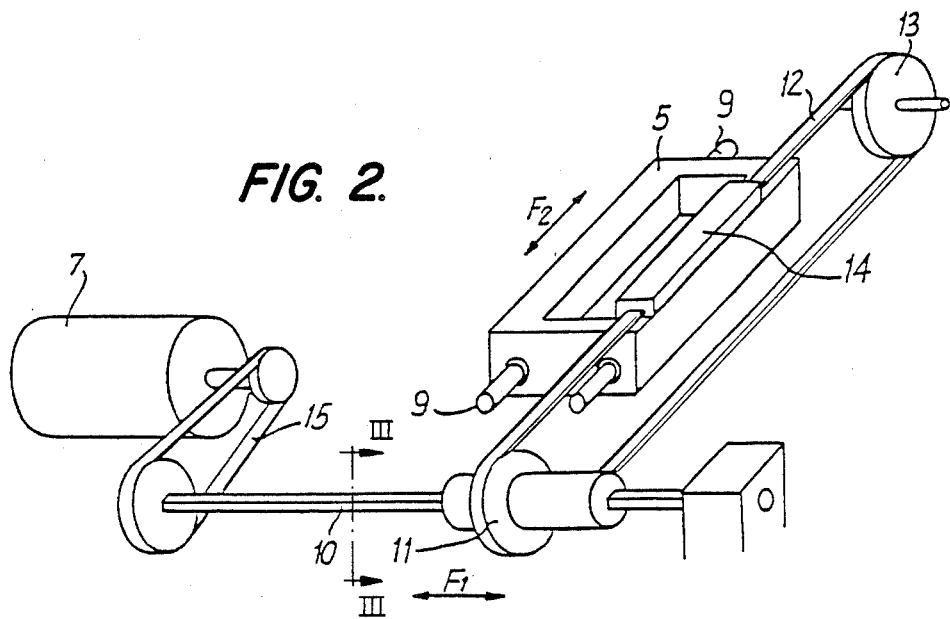
FIG. 2 is a perspective view of the inside frame and of its driving device.

As shown in FIG. 2, the inner frame 5 is mounted and slides on rails 9 which are mounted to outer frame 4.

A plurality of tools are picked up on the inner movable member. The tools (not shown) are supported by the inner periphery of inner frame 5 and pass through this frame.

The motor 7 drives in rotation a bar 10, of square cross-section for example, on which a pulley 11 can slide whilst remaining fast in rotation with the said bar 10.

Figure 3A:
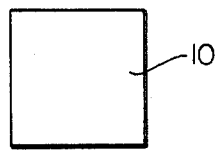
FIG. 3a is a cross-section along line III—III of FIG. 2.
Figure 3B:
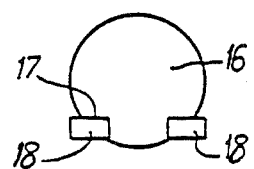

On said pulley 11 passes a belt 12, a notched belt for example, fixed to the frame 5 and passing over a return pulley 13. The belt 12 is fixed to the frame 5 at 14. Moreover, the movement of the motor 7 is transmitted to the bar 10 by means of a belt and pulley system 15. According to a variant embodiment illustrated in FIG. 3b, the bar 10, of FIG. 3a instead of having a square cross-section, can have a circular cross-section 16, comprising flat portions 17 with which cooperate blocks or bearings 18 integral with the pulley 11. Optionally, the bar 10 can serve as a slide for the frame 4, via the pulley 11 which in that case is connected to the frame by a bearing (not shown).

It is therefore conceivable that the motor 7, being fixedly mounted in the compartment 6 can drive the frame 5 in rotation alternatively in the direction of arrows F2, whereas the pulley 11 can move according to arrows F1, to take into account the displacements of the external frame 4.

As illustrated in FIG. 4, said outer frame 4 is mounted and slides on rails 19 which are mounted to frame structure 1. The motor 8, housed in the compartment 6, drives the inner frame 4 in movements according to arrows F1 owing to a belt transmission of which the belts 20 and 21 are secured at 22 and 23 on the outer frame 4 and are in turn driven in rotation via a belt and pulley system 24.

FIG. 5 shows the different elements of FIGS. 2 and 4 one overlapping the other.

The different pulleys and belts which are used can be notched in order to avoid any slipping. In addition, it is also possible to provide means for securing the belts on the different movable members, which makes it possible to modify at least one of the fastening points in order to control the tension of the belts.

When the motors 7 and 8 which are used are of the step-by-step type, an initializing device can be provided which corrects any loss of step occuring during operation.

Every time the device is energized or everytime one of the signals indicating an end-of-course of the manipulator is not actuated, the device can reset itself to the zero settings of the sliding axes of the frames 4 and 5. When the device has reset itself to zero, the frames 4 and 5 are reset to a selected reference position.

Optionally, the lengths of the columns 2 can be controlled to give an extra adjusting direction to the manipulator according to the invention.

I claim:

1. An automated tool manipulating structure comprising:
   a support means;
   a first frame mounted on said supported means, said first frame slides in its plane along a first axis $F_1$;
   a first means for actuating said first frame, said first means for actuating being affixed to said support means and said first frame;
   a second frame mounted inside said first frame, said second frame slides in its plane along a second axis $F_2$, said second axis $F_2$ is perpendicular to said first axis $F_1$ and said plane of said first frame and said plane of said second frame are parallel; and
   a second means for actuating said second frame, said second means for actuating being affixed to said support means and said second frame, said second actuating means includes:
   a rotating shaft extended parallel to said first axis $F_1$;
   a pulley slidably mounted on said rotatable shaft; and
   a belt operated by said pulley.

2. The automated tool manipulating structure of claim 1, wherein said first means for actuating includes:
   a rotating shaft extended parallel to said second axis $F_2$;
   a pulley mounted on said axis $F_2$ rotatable shaft; and
   a belt operated by said pulley.

3. The automated tool manipulating structure of claim 1, wherein said support means includes columns and a frame structure on said columns, said frame structure is adapted to support said first frame, said first means for actuating, said second frame, and said second means for actuating.

4. The automated tool manipulating structure of claim 3, wherein said platform is adapted to overhang and sit upon said columns.

5. A manipulator of the type comprising a frame structure, two movable members that can slide with respect to the frame structure under the action of actuating members and in both ways of two different directions, at least one of the movable members (4) being shaped as a frame and capable of sliding in its plane with respect to the frame structure (1) and the other movable member (5) being mounted inside the frame (4) so as to slide with respect of the latter in parallel to its plane, the actuating members (7,8) being fixedly mounted (6) on the frame structure (1) such that movement is transmitted to the movable members (4,5) by way of transmissions, the transmission associated to the movable member inside the frame includes a sliding element (11), and whereby the transmission associated to the inner movable member (5) includes a shaft (10) driven in rotation with respect to which can slide a pulley (11) fast in rotation with said shaft (10) and in that the movement of the inner movable member (5) is imparted by the pulley (11).

6. The manipulator according to claim 5, characterized in that the transmissions are of the belt and pulley type.

* * * * *